June 1, 1926.
P. SIMONS
HARROW CONSTRUCTION
Filed Jan. 9, 1925
1,586,712
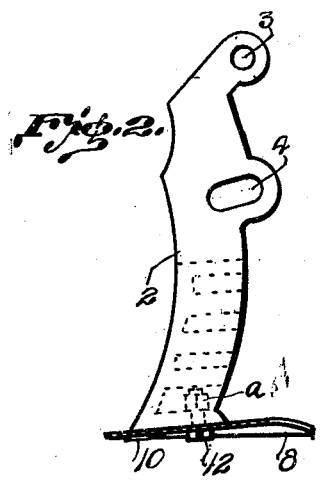
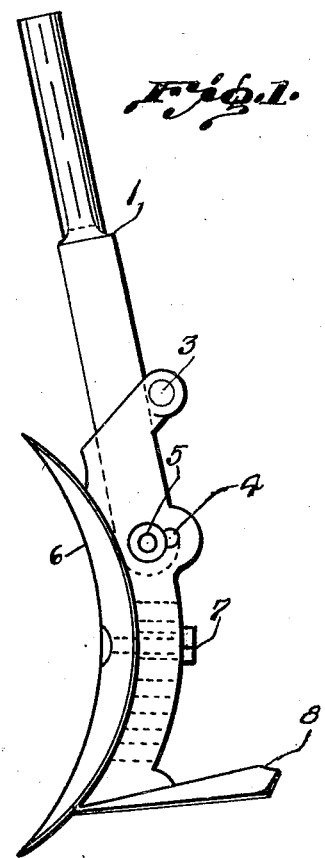
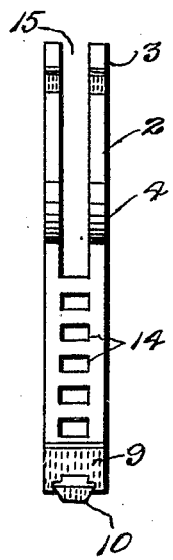
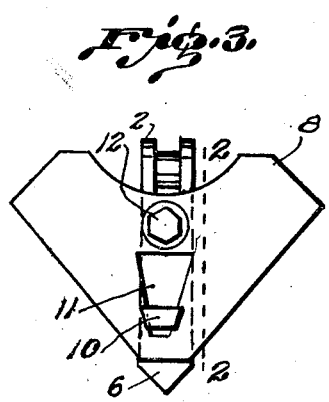
INVENTOR.
Philip Simons.
BY Ithiel J. Cilley
ATTORNEY.

Patented June 1, 1926.

1,586,712

UNITED STATES PATENT OFFICE.

PHILIP SIMONS, OF PEWAMO, MICHIGAN.

HARROW CONSTRUCTION.

Application filed January 9, 1925. Serial No. 1,382.

My invention relates to improvements in harrows, and its objects are: first, to provide a means whereby the harrow tooth may be varied in its relative vertical position with a weed cutting blade; second, to provide a means whereby the weed cutting blade may be readily attached to, or removed from the supporting arm.

I attain these objects by the mechanism and arrangement of parts shown in the accompanying drawing, in which Fig. 1 is a side view of the supporting arm, the cultivator arm and the weed cutter assembled; Fig. 2 is a like view of the cultivator arm with the weed cutter shown in section on the line 2—2 of Fig. 3. Fig. 3 is a bottom plan of the weed cutter secured to the cultivator arm. Fig. 4 is a back elevation of the cultivator arm, and Figs. 5 and 6 are enlarged plans of the weed cutter, showing different means for securing it to the cultivator arm.

Similar reference characters indicate similar parts throughout the several views.

The principal object of this invention is the easy, convenient and safe means of connecting the harrow teeth, and the weed cutter to the cultivator arm, and of adjusting them thereon, and for this purpose I provide a supporting arm 2, with a slot 15 for the reception of the lower end of the permanent arm 1, which latter is pivotally connected therewith at 4, this being a slot so located that the bolt 5 may be adjusted therein to vary the position of the supporting arm with the permanent arm, as may be desired. At 3 I have shown a permanently located pin designed to hold the arm 2 from passing a given vertical position when passing through the soil in the process of harrowing. The harrow tooth 6 is securely bolted upon the arm 2 by means of the bolt 7, and it may be adjusted longitudinally of the arm by passing the said bolt through different openings 14 in the arm. Thus, if it be desired to do shallow harrowing the bolt is passed through one of the upper holes 14, and if deep harrowing be desired the bolt is passed through a correspondingly lower opening 14.

To properly and easily secure the weed cutter 8 to the end of the arm 2 I provide a shouldered lug 10 that is of a proper size so the head thereon may be easily passed through the upper end of the opening 11 in the weed cutter, and it may then be slid downwardly until the neck of the lug engages the sides of the opening, with the head of the lug overlapping the surface of the cutter plate, as indicated in Fig. 3. When the cutter plate 8 has been properly placed, as above described, I insert a bolt 12 through the opening 13 in said plate, and screw it into a properly prepared nut $a$ in the end of the arm 2.

At 9, in Fig. 4, I have shown the relative form of the end of the arm 2, with the lug 10 shown in perspective.

In Fig. 6 I have shown the opening 11 through the weed cutter plate extended beyond that shown in Fig. 5, to indicate its form when depending wholly upon the use of the lug 10, together with the bearing of the end of the plate 8 against the back surface of the harrow tooth 6, for holding the cutter plate in proper position without the use of the bolt 12, shown in Fig. 3 and indicated in Fig. 5. When securing the plate to the arm without the bolt 12 it is necessary to make the lug 10 somewhat longer, as indicated in Fig. 4, than when using said bolt, as shown in Fig. 3.

Having thus fully described my invention, what I claim as new in the art, is:—

1. In harrow tooth construction, a supporting arm having the lower end formed for the reception of a weed cutting plate, a lug formed with a narrow neck and a broad cap, a weed cutting plate having a slot therethrough, said slot being wide at the back end and narrow at the front end and in condition to pass the lug through the back end and wedge it firmly in the front end to hold the plate securely upon the end of the supporting arm.

2. In combination with the elements covered in claim 1, a bolt passed through the plate back of the slot and screwed firmly into the end of the supporting arm.

3. In harrow tooth construction, a supporting arm having the lower end positioned at right angles with the body thereof, a lug made integral with the lower end and extending outwardly at right angles therewith, said lug constructed with a narrow neck and a broad head thereon, a weed cutting plate having a slot therethrough for the reception and close locking of the lug upon the plate, a harrow tooth vertically disposed upon the supporting arm, and the arm so disposed that the harrow tooth may be adjusted vertically thereon and held securely thereto in position to engage the end of the weed cutting plate upon the back surface of its lower end.

Signed at Pewamo, Michigan, December 26, 1924.

PHILIP SIMONS.